US008565519B2

(12) United States Patent
Weybrew

(10) Patent No.: US 8,565,519 B2
(45) Date of Patent: Oct. 22, 2013

(54) PROGRAMMABLE PATTERN-BASED UNPACKING AND PACKING OF DATA CHANNEL INFORMATION

(75) Inventor: Steven Todd Weybrew, Portland, OR (US)

(73) Assignee: QUALCOMM Incorporated, San Diego, CA (US)

( * ) Notice: Subject to any disclaimer, the term of this patent is extended or adjusted under 35 U.S.C. 154(b) by 1156 days.

(21) Appl. No.: 12/027,823

(22) Filed: Feb. 7, 2008

(65) Prior Publication Data

US 2008/0193050 A1    Aug. 14, 2008

Related U.S. Application Data

(60) Provisional application No. 60/889,229, filed on Feb. 9, 2007, provisional application No. 60/889,896, filed on Feb. 14, 2007.

(51) Int. Cl.
| | | |
|---|---|---|
| *G06K 9/60* | (2006.01) | |
| *G06K 9/36* | (2006.01) | |
| *G06K 9/46* | (2006.01) | |
| *G06K 9/00* | (2006.01) | |
| *H04L 12/28* | (2006.01) | |
| *H04L 12/56* | (2011.01) | |
| *H04N 7/12* | (2006.01) | |
| *H04N 11/02* | (2006.01) | |
| *H04N 11/04* | (2006.01) | |
| *H04B 1/66* | (2006.01) | |

(52) U.S. Cl.
USPC ........... 382/162; 382/303; 382/304; 382/232; 370/395.4; 375/240.26; 375/240; 375/240.01; 375/240.22

(58) Field of Classification Search
USPC ................................................ 382/303, 304
See application file for complete search history.

(56) References Cited

U.S. PATENT DOCUMENTS

| 5,452,235 A | * | 9/1995 | Isani ............................... 710/68 |
|---|---|---|---|
| 5,671,440 A | | 9/1997 | Curry |

(Continued)

FOREIGN PATENT DOCUMENTS

| GB | 2409063 A | 6/2005 |
|---|---|---|
| JP | 8235346 A | 9/1996 |

(Continued)

OTHER PUBLICATIONS

International Search Report—PCT/US08/053511—International Search Authority, European Patent Office—Oct. 31, 2008.

(Continued)

*Primary Examiner* — Michelle Entezari
(74) *Attorney, Agent, or Firm* — Matthew Evans; James R. Gambale, Jr.

(57) ABSTRACT

In general, the present disclosure describes various techniques for programmable, pattern-based unpacking and packing of data channel information, including still image, video, and audio component data. One example device comprises a programmable processor having a plurality of processing pipelines. The processor is configured to receive pattern information that specifies a pattern for a plurality of input data components, the pattern information comprising a plurality of pattern elements that are each associated with one or more of the input data components, and each input data component being selected from a component group consisting of a still image data component, an audio data component, and a video data component. For example, the input data components may comprise pixel data components, such as color channels. The processor is further configured to provide each input data component to a selected processing pipeline of the processor in accordance with the pattern information.

91 Claims, 13 Drawing Sheets

(56) References Cited

U.S. PATENT DOCUMENTS

| | | | |
|---|---|---|---|
| 5,805,173 A * | 9/1998 | Glennon et al. | 345/501 |
| 5,949,410 A * | 9/1999 | Fung | 715/203 |
| 6,172,990 B1 * | 1/2001 | Deb et al. | 370/474 |
| 6,526,224 B1 * | 2/2003 | Kawahara et al. | 386/328 |
| 6,693,643 B1 | 2/2004 | Trivedi et al. | |
| 6,704,315 B1 * | 3/2004 | Besset-Bathias | 370/395.4 |
| 6,708,217 B1 * | 3/2004 | Colson et al. | 709/231 |
| 6,883,084 B1 | 4/2005 | Donohoe | |
| 6,891,544 B2 | 5/2005 | Oka et al. | |
| 7,181,063 B2 * | 2/2007 | Walmsley et al. | 382/162 |
| 7,194,752 B1 * | 3/2007 | Kenyon et al. | 725/22 |
| 7,268,707 B2 * | 9/2007 | Takashi et al. | 341/59 |
| 7,424,597 B2 | 9/2008 | Lee et al. | |
| 7,477,796 B2 * | 1/2009 | Sasaki et al. | 382/248 |
| 2001/0033392 A1 | 10/2001 | Utsunomiya | |
| 2002/0188824 A1 * | 12/2002 | Ganapathy et al. | 712/35 |
| 2003/0037085 A1 | 2/2003 | Sandbote | |
| 2003/0043295 A1 | 3/2003 | Reneau et al. | |
| 2003/0179782 A1 * | 9/2003 | Eastty | 370/535 |
| 2005/0071404 A1 * | 3/2005 | Nutter et al. | 708/446 |
| 2005/0125636 A1 | 6/2005 | Ford et al. | |
| 2005/0271072 A1 * | 12/2005 | Anderson et al. | 370/419 |
| 2005/0276495 A1 * | 12/2005 | Youm et al. | 382/243 |
| 2006/0083194 A1 * | 4/2006 | Dhrimaj et al. | 370/328 |
| 2006/0165088 A1 * | 7/2006 | Monta et al. | 370/395.4 |
| 2007/0011364 A1 * | 1/2007 | Wezelenburg | 710/22 |
| 2007/0046817 A1 * | 3/2007 | Yagi et al. | 348/554 |
| 2009/0034856 A1 * | 2/2009 | Moriya et al. | 382/238 |

FOREIGN PATENT DOCUMENTS

| | | |
|---|---|---|
| JP | 10501107 A | 1/1998 |
| JP | 11008853 A | 1/1999 |
| JP | 2001306532 A | 11/2001 |
| JP | 2002290970 A | 10/2002 |
| JP | 2005259178 A | 9/2005 |
| JP | 2006260477 A | 9/2006 |
| TW | 444495 B | 7/2001 |
| TW | 452708 B | 9/2001 |
| TW | 508940 B | 11/2002 |
| TW | 529273 B | 4/2003 |

OTHER PUBLICATIONS

Witter Opinion—PCT/US08/053511—International Search Authority, European Patent Office—Oct. 31, 2008.
Taiwan Search Report—TW097104983—TIPO—Mar. 21, 2012.

* cited by examiner

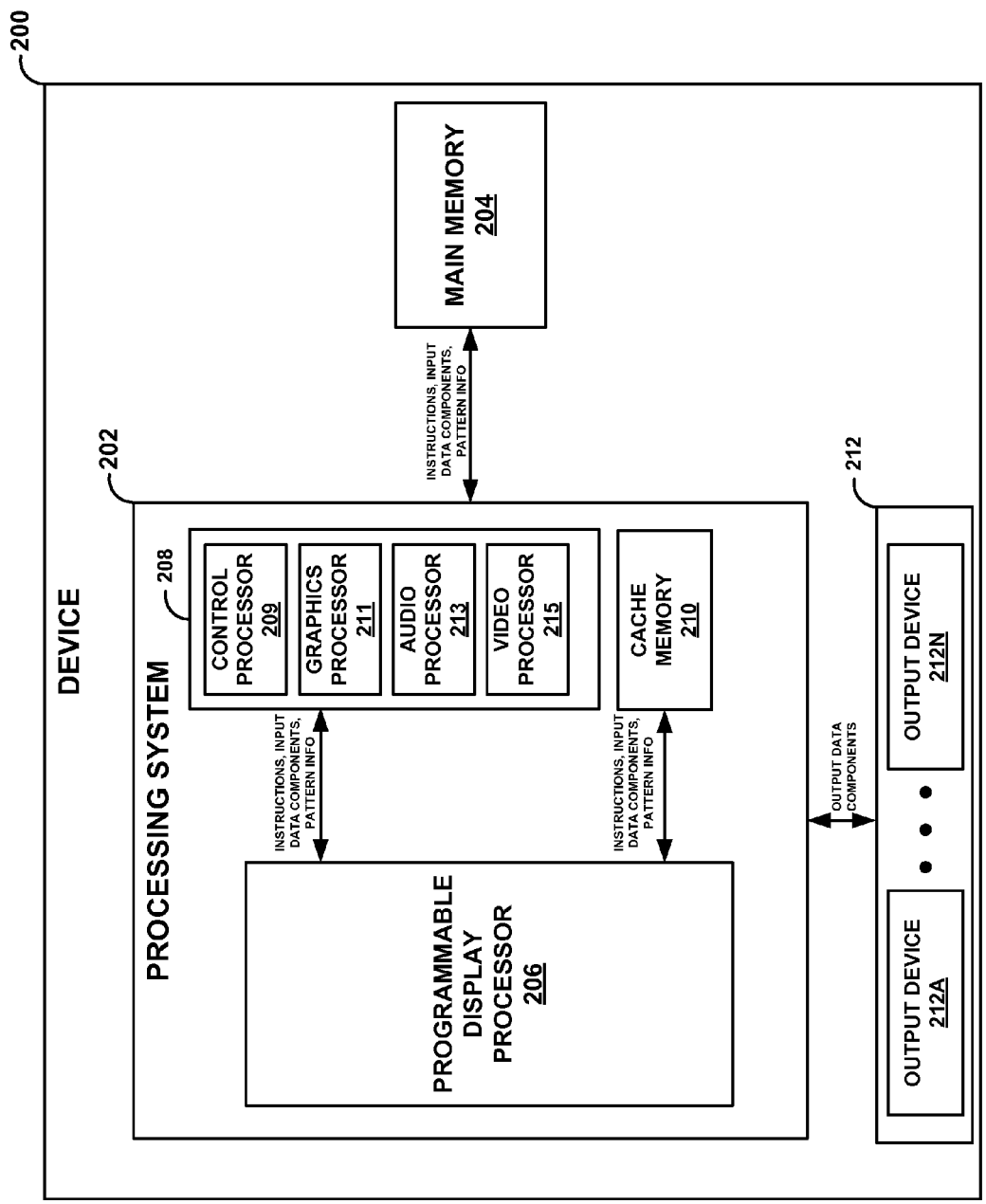

| RUN LENGTH | COMPONENT IDENTIFIER |
|---|---|
| 4 | 1 |
| 4 | 0 |
| 4 | 2 |

$S_H$
0 = LEFT-TO-RIGHT
1 = RIGHT-TO-LEFT $S_V$
0 = TOP-TO-BOTTOM
1 = BOTTOM-TO-TOP

| $P_H$ | $P_W$ | $S_H$ | $S_V$ | $B_{PP}$ | RUN LENGTH | COMPONENT IDENTIFIER |
|---|---|---|---|---|---|---|
| 2 | 2 | 0 | 0 | 8 | 4 | 1 |
| 2 | 2 | 0 | 0 | 8 | 4 | 0 |
| 2 | 2 | 0 | 0 | 8 | 4 | 2 |

700

Y = LUMA
Cr = RED CHROMA DIFFERENCE
Cb = BLUE CHROMA DIFFERENCE

| $Y_{P0}Cr_{P0,P1}Alpha_{P0}$ | $Y_{P1}Cb_{P0,P1}Alpha_{P1}$ | $Y_{P2}Cr_{P2,P3}Alpha_{P2}$ | $Y_{P3}Cb_{P2,P3}Alpha_{P3}$ |
|---|---|---|---|
| $Y_{P4}Cr_{P4,P5}Alpha_{P4}$ | $Y_{P5}Cb_{P4,P5}Alpha_{P5}$ | $Y_{P6}Cr_{P6,P7}Alpha_{P6}$ | $Y_{P7}Cb_{P6,P7}Alpha_{P7}$ |
| $Y_{P8}Cr_{P8,P9}Alpha_{P8}$ | $Y_{P9}Cb_{P8,P9}Alpha_{P9}$ | $Y_{P10}Cr_{P10,P11}Alpha_{P10}$ | $Y_{P11}Cb_{P10,P11}Alpha_{P11}$ |
| $Y_{P12}Cr_{P12,P13}Alpha_{P12}$ | $Y_{P13}Cb_{P12,P13}Alpha_{P13}$ | $Y_{P14}Cr_{P14,P15}Alpha_{P14}$ | $Y_{P15}Cb_{P14,P15}Alpha_{P15}$ |

COMPONENT IDENTIFIER
0 = LUMA
1 = RED CHROMA DIFFERENCE
2 = BLUE CHROMA DIFFERENCE
3 = ALPHA

| $P_H$ | $P_W$ | $V_{SS}$ | $H_{SS}$ | RUN LENGTH | COMPONENT IDENTIFIER |
|---|---|---|---|---|---|
| 4 | 4 | 0 | 0 | 16 | 0 |
| 4 | 4 | 0 | 1 | 8 | 1 |
| 4 | 4 | 0 | 1 | 8 | 2 |
| 4 | 4 | 0 | 0 | 16 | 3 |

FIG. 7B

COMPONENT IDENTIFIER

0 = LUMA
1 = RED CHROMA DIFFERENCE
2 = BLUE CHROMA DIFFERENCE
3 = ALPHA

| $P_H$ | $P_W$ | $V_{SS}$ | $H_{SS}$ | RUN LENGTH | COMPONENT IDENTIFIER |
|---|---|---|---|---|---|
| 8 | 8 | 0 | 0 | 64 | 0 |
| 8 | 8 | 0 | 1 | 32 | 1 |
| 8 | 8 | 0 | 1 | 32 | 2 |
| 8 | 8 | 0 | 0 | 64 | 3 |

FIG. 8

COMPONENT IDENTIFIER

0 = FRONT LEFT
1 = FRONT CENTER
2 = FRONT RIGHT
3 = REAR LEFT
4 = REAR CENTER
5 = REAR RIGHT
6 = SUB-WOOFER

PROGRAMMABLE PATTERN-BASED UNPACKING AND PACKING OF DATA CHANNEL INFORMATION

RELATED APPLICATIONS

This application claims the benefit both of U.S. Provisional Application No. 60/889,229, filed Feb. 9, 2007, and also U.S. Provisional Application No. 60/889,896, filed Feb. 14, 2007, the entire contents of each being incorporated herein by reference.

TECHNICAL FIELD

This application relates to the processing of image, audio, and/or video data, and more particularly, relates to the processing of image, audio, and/or video data stored in various formats and patterns.

BACKGROUND

Graphics and image devices are widely used to render 2-dimensional (2-D) and 3-dimensional (3-D) images for various applications, such as video games, graphics programs, computer-aided design (CAD) applications, simulation and visualization tools, imaging, and the like. Audio devices may be used in conjunction with these devices to provide sound or even potentially to process speech.

Graphics processors, display processors, audio processors, or multi-media processors used in these devices may be configured to perform parallel and/or vector processing of data. General purpose CPU's (central processing units) with or without SIMD (single instruction, multiple data) extensions may also be configured to process data. In vector processing, a single instruction operates on multiple data items at the same time. In parallel processing, instructions operate on one data item at a time. In the field of graphics processing, processors often perform instructions on pixel data. Pixel data describes various attributes of a pixel, including the color of the pixel in a particular color space, and oftentimes, the transparency (alpha), of the pixel that is to be displayed, printed, and/or stored.

Common color spaces for pixel data include RGB (Red-Green-Blue), YUV (Luma-Blue Luma Difference-Red Luma Difference), $YC_bC_r$ (Luma-Blue Chroma Difference-Red Chroma Difference), and CMYK (Cyan-Magenta-Yellow-Black), among others. Color spaces do not typically represent color as a single value, but rather represent color with multiple channels of information, also known as a tuple of color components. As one example, the RGB color space includes three channels that respectively describe the red, green and blue content for a particular pixel. Likewise, the $YC_bC_r$ color space describes the luma, blue chroma difference, and red chroma difference values for a particular color. Certain higher-order color spaces may also be implemented in certain cases and with certain technologies. For example, some printers may now use six or eight inks, which may require six to eight different color channels to drive operation.

Processors that process pixel data typically do so using parallel processing. As such, each channel of pixel data is typically processed separately in different processing pipelines. However, the pattern in which such multi-channel pixel data is stored in memory or other devices may vary from application to application.

SUMMARY

In general, the present disclosure describes various techniques for run-time, programmable, pattern-based unpacking and packing of data channel information, including still image, video, and audio component data. Information that indicates a pattern of received data components, such as pixel data components, is provided to a processor or a software module. Based on this pattern information, an unpacking engine is capable of providing the data components to their selected processing pipelines. A packing engine may also be utilized to order output data components into a specific pattern after they have been processed by their respective processing pipelines. Again, the packing engine is provided information indicating what pattern to use when packing the processed data components. In such fashion, the unpacking and/or packing engines can be provided information to arrange data components into a pattern appropriate for a particular application. As one example, if pixel data is to be immediately displayed after processing, it is often beneficial to provide pattern information to the packing engine indicating the expected data arrangement for the frame buffer of a display. The packing and unpacking engines may be implemented in hardware, but may be implemented in software. In many cases, such as with larger data, the pattern of input or output data components specified by the pattern information may repeat.

In one aspect, a method includes receiving pattern information that specifies a pattern for a plurality of input data components, wherein the pattern information includes a plurality of pattern elements that are each associated with one or more of the input data components, and wherein the input data components include still image data components, video data components, and/or audio data components. The method further includes providing each input data component to a selected processing pipeline in accordance with the pattern information.

In one aspect, a device includes a programmable processor having a plurality of processing pipelines. The processor is configured to receive pattern information that specifies a pattern for a plurality of input data components, wherein the pattern information includes a plurality of pattern elements that are each associated with one or more of the input data components, and wherein the input data components include still image data components, video data components, and/or audio data components. For example, the input data components may include pixel data components, such as color channels. The processor is further configured to provide each input data component to a selected processing pipeline of the processor in accordance with the pattern information.

In one aspect, a method includes receiving pattern information that specifies a pattern for a plurality of output data components that are processed by a plurality of processing pipelines, wherein the pattern information includes a plurality of pattern elements that are each associated with one or more of the output data components, and wherein the output data components include still image data components, video data components, and/or audio data components. The method further includes processing each output data component from a selected processing pipeline in accordance with the pattern information.

In one aspect, a device includes a programmable processor having a plurality of processing pipelines. The processor is configured to receive pattern information that specifies a pattern for a plurality of output data components that are processed by the processing pipelines, wherein the pattern information includes a plurality of pattern elements that are each associated with one or more of the output data components, and wherein the output data components include still image data components, video data components, and/or audio data components. The processor is further configured to process each output data component from a selected processing pipeline of the processor in accordance with the pattern information.

The details of one or more aspects of the disclosure are set forth in the accompanying drawings and the description below. Other features, objects, and advantages will be apparent from the description and drawings, and from the claims.

BRIEF DESCRIPTION OF DRAWINGS

FIG. 2A is a block diagram illustrating an example device having a programmable display processor that may be used to implement pattern-based unpacking and packing of data channel information, according to an aspect of this disclosure.

FIGS. 5A-5C are diagrams illustrating an example pattern and also examples of pattern information that may be used by the display processor shown in FIG. 2A to specify or otherwise describe the example pattern, according to an aspect of this disclosure.

FIGS. 6A-6D are additional diagrams illustrating an example pattern and also examples of pattern information that may be used by the display processor shown in FIG. 2A to specify or otherwise describe the example pattern, according to an aspect of this disclosure.

FIGS. 7A-7B are additional diagrams illustrating an example pattern and an example of pattern information that may be used by the display processor shown in FIG. 2A to specify or otherwise describe the example pattern, according to an aspect of this disclosure.

FIG. 8 is an additional diagram illustrating another example of pattern information that may be used by the display processor shown in FIG. 2A to specify or otherwise describe an example tiled pattern, according to an aspect of this disclosure.

DETAILED DESCRIPTION

Figure 1:
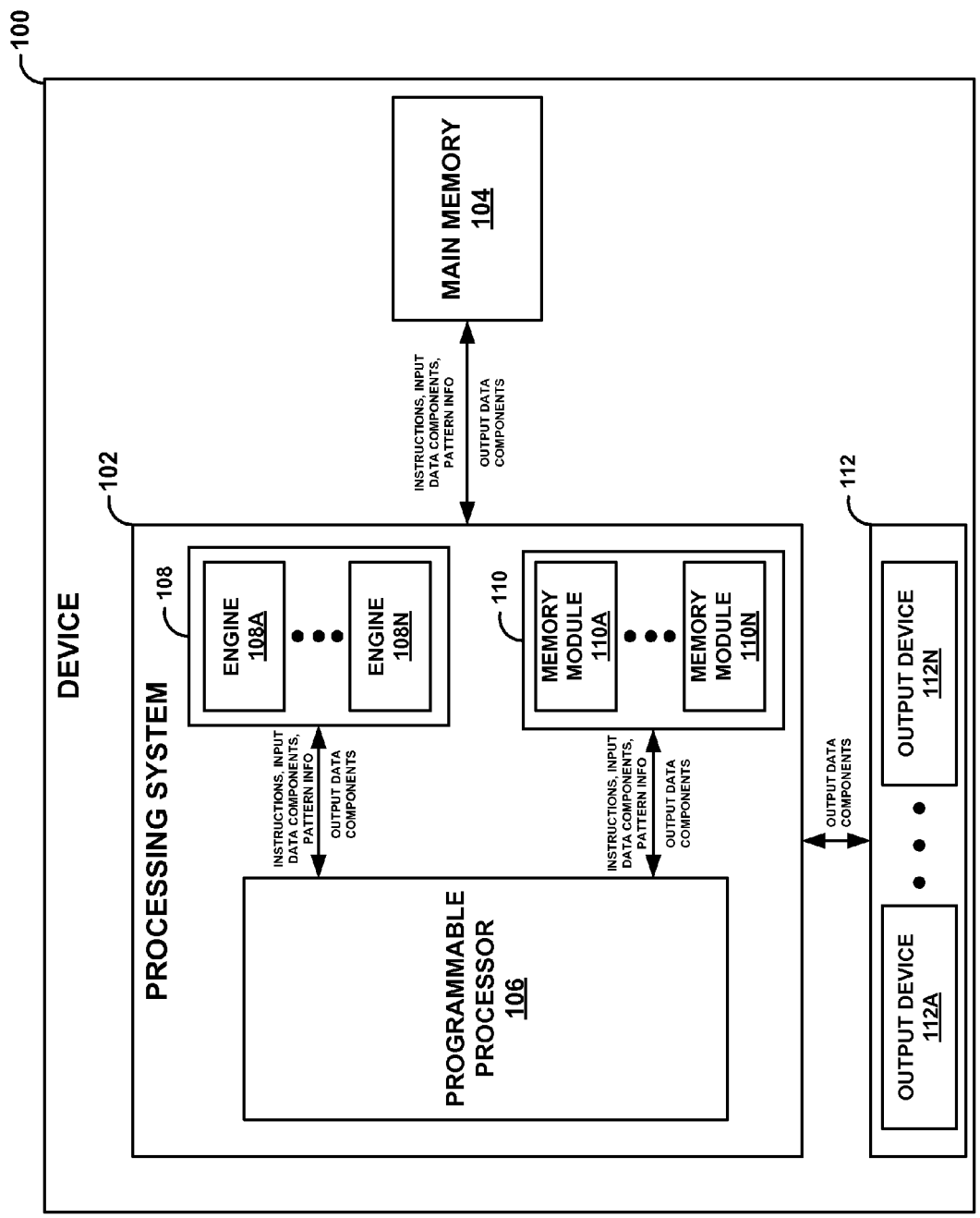
FIG. 1 is a block diagram illustrating a device that may be used to implement pattern-based unpacking and packing of data channel information, according to an aspect of this disclosure.

FIG. 1 is a block diagram illustrating a device 100 that may be used to implement pattern-based unpacking and packing of data channel information, according to one aspect. Device 100 may be a stand-alone device or may be part of a larger system. In one aspect, device 100 may comprise a wireless communication device (such as a wireless handset), or may be part of a digital camera or other video device. In one aspect, device 100 may be included in one or more integrated circuits, or chips.

Device 100 is capable of processing a variety of different data types and formats. For example, device 100 may process still image data, audio data, video data, or other multi-media data, as will be described in more detail below. As used throughout this disclosure, audio data may include sound data and/or speech data. Device 100 includes a programmable processor 106. Processor 106 may have a plurality of processing pipelines. In one aspect, processor 106 may be a scalar or a vector processor. In one aspect, processor 106 may be a display processor, a graphics processor, an image processor, an audio processor, a video processor, or other form of multi-media processor. In one aspect, processor 106 may be a baseband processor or a DSP (digital signal processor) for vector swizzle implementations.

Device 100 may utilize a software programmable pattern which is downloaded to the hardware to describe an order or format of data components, such as a pattern of color components for pixel data. Any time a pattern is added or updated, software drivers of applications running on device 100 that wish to implement the new or updated patterns can be updated. In such fashion, the hardware of device 100 need not necessarily be changed to support new or updated patterns. By using programmable patterns within device 100, there is no theoretical limit on the number of data patterns that may be supported by device 100. In addition, device 100 may support different patterns for processing incoming data and outgoing data.

In one aspect, processor 106 is configured to receive pattern information that specifies a pattern for a plurality of input data components. These input data components may include still image data components, video data components, and/or audio data components. For example, the input data components may include pixel data components, such as color channels. Processor 106 is further configured to process each input data component in a selected processing pipeline of processor 106 in accordance with the pattern information, as will be described in more detail below. In one aspect, processor 106 is capable of receiving pattern information or pattern definitions to update the pattern information processing capabilities of device 100 for updated or new patterns. In this aspect, device 100 provides added flexibility in the type of number of patterns that can be supported by processor 106. The patterns and associated pattern information may be configurable by software that is implemented by device 100. In one aspect, software applications that run on device 100 are capable of defining new patterns and downloading pattern information associated with these patterns to processor 106.

Device 100 is capable of executing various different applications, such as graphics applications, image applications, audio applications, video applications, or other multi-media applications. For example, device 100 may be used for image applications, audio applications, video game applications, video applications, digital camera applications, instant messaging applications, mobile applications, or audio or video streaming applications. In FIG. 1, processor 106 is part of a processing system 102. Processing system 102 may further include one or more engines 108A-108N (collectively, 108) and one or more memory modules 110A-110N (collectively, 110). Engines 108 may include graphics, audio, and/or video engines. Processor 106 is coupled to and may exchange information with both engines 108 and memory modules 110. Engines 108 may include one or more processors, and memory modules 110 may include one or more caches to store data and instructions for use by processor 106 and engines 108.

Main memory 104 may be a large, slower memory with respect to memory modules 110, according to one aspect. In one aspect, main memory 104 may be located off-chip with respect to processing system 102. Main memory 104 may store data and instructions that can then be loaded into one or more of the memory modules 110.

Device 100 also includes one or more output devices 112A-112N (collectively, 112). In one aspect, output devices 112 include a display device, such as an LCD (liquid crystal display) or other form of display device. In one aspect, output devices 112 include a printer or other device capable of providing image data in a tangible form. Many different forms of output devices 212 may be used within device 200.

During operation of device 100, processor 106 may be capable of using input data to execute one or more instructions that generate output data as a result. Processor 106 may receive instructions for execution from one or more of engines 108, one or more of memory modules 110, or main memory 104. In addition, processor 106 may receive input data used during instruction execution from one or more of engines 108, one or more of memory modules 110, or main memory 104. The input data may include one or more input data components. For example, if the input data is pixel data, the input data components would include pixel data components, such as color channels.

Processor 106 may receive input data and input data components having various different formats, or patterns, depending on the source of the data. For example, engines 108 may provide input data of various different formats, and memory modules 110 and/or memory 104 may store data in various different formats, as well. In many instances, the input data received by processor 106 arrive as a packed group of data components. Input data components within the packed group may be arranged in a particular pattern, according to the way in which the data components were arranged by the source of the data (such as by one or more of engines 108, one or more of memory modules 110, or main memory 104). For example, the data components may be arranged within the packed group in an interleaved pattern, where the data components are intermingled in a repetitive fashion. Alternatively, the data components may be arranged using a different pattern, such as a planar pattern, wherein similar types of data components are grouped together.

Processor 106 may be capable of processing input data components having a variety of different formats. In one aspect, processor 106 may be configured to receive pattern information from one or more of engines 108 and/or one or more of memory modules 110. The pattern information specifies a pattern for a plurality of input data components that are also received by processor 106. For example, processor 106 may receive pattern information from engine 108A that specifies a pattern of input data components that are provided by engine 108A to processor 106. Processor 106 may be further configured to process each input data component in a selected processing pipeline of processor 106 in accordance with the pattern information. By knowing the pattern of the input data components, processor 106 is capable of selecting one or more of its processing pipelines and processing each input data component in a selected pipeline in accordance with the pattern information.

In one aspect, the processing pipelines of processor 106 process the input data components and produce output data components. Processor 106, in this aspect, may be further configured to receive additional pattern information that specifies a pattern for the output data components that are processed by the processing pipelines. Processor 106 may receive the additional pattern information from one or more of engines 108 and/or one or more of memory modules 110. Processor 106 may be configured to process each output data component from a selected processing pipeline in accordance with the additional pattern information. In one aspect, processor 106 may provide the output data components to one or more of output devices 112, main memory 104, one or more of memory modules 110, and/or one or more of engines 108 for storage or other use.

The additional pattern information may specify the pattern of data components expected by one or more of output devices 112 and/or one or more of engines 108 that receive the output data components for output (such as, for example, for further processing, display, and/or printing). In such fashion, processor 106 is capable of processing pattern information that specifies ordering of data components (e.g., input data components, output data components) for still image data, audio data, video data, or other multi-media data. Processor 106 is not limited to a predetermined number of patterns that may be used. Instead, processor 106 may process data of any number of different programmable patterns. In addition, processor 106 is capable of processing data using new or updated patterns without necessarily requiring any hardware changes. Instead, processor 106 uses pattern information to determine how to process incoming and outgoing data components based upon patterns specified in the pattern information. This provides a great deal of flexibility to pattern processing that may be implemented by processor 106.

FIG. 2A is a block diagram illustrating an example device 200 that includes a programmable display processor 206, according to one aspect. In this aspect, device 200 shown in FIG. 2A is an example instantiation of device 100 shown in FIG. 1, and, similar to device 100, also may be capable of implementing pattern-based unpacking and packing of data channel information. Device 200 includes a processing system 202, a main memory 204, and one or more output devices 212A-212N (collectively, 212).

Programmable display processor 206 is included within processing system 202 of device 200. In one aspect, display processor 206 processes pixel data for display. Such processing may include rotation, scaling, transparency, and overlaying, among other things. Processing system 202 may further include one or more engines 208, which may include a control processor 209, a graphics processor 211, an audio processor 213, and a video processor 215. In one aspect, processing system 202 includes at least one of control processor 209, graphics processor 211, audio processor 213, and video processor 215. Processing system 202 further includes a cache memory 210.

Figure 2B:
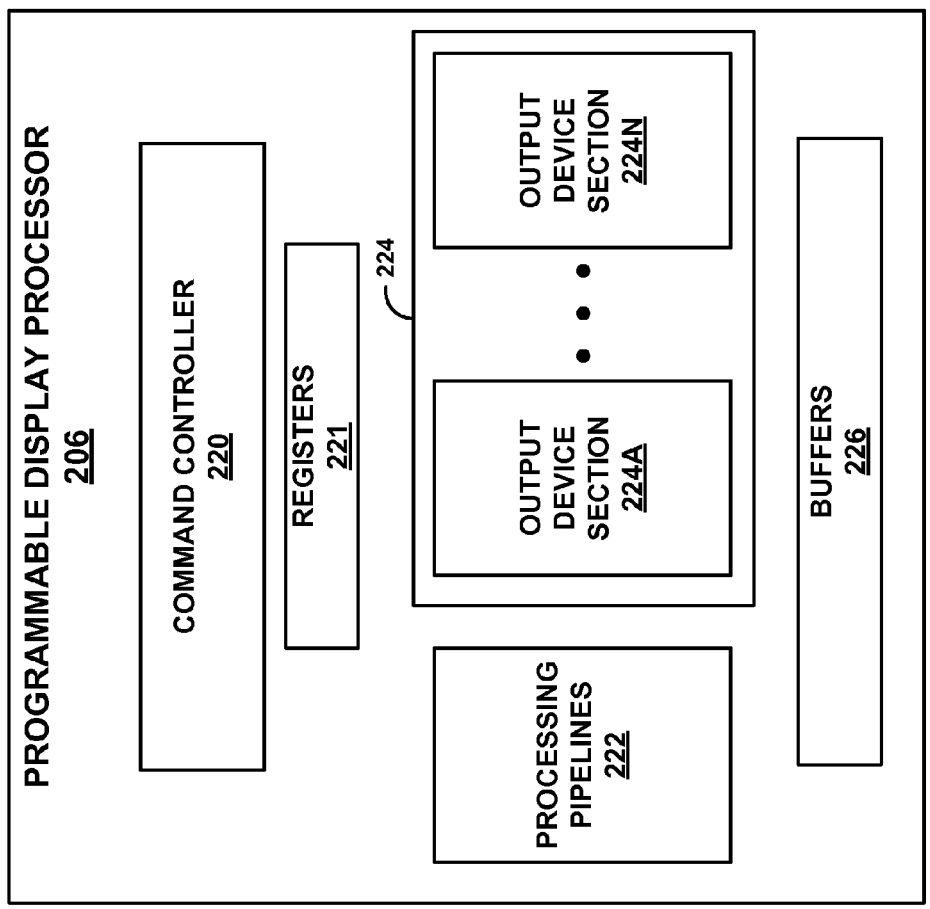
FIG. 2B is a block diagram illustrating additional details of the display processor shown in FIG. 2A, according to an aspect of this disclosure.

Display processor 206 may include processing pipelines 222 (shown in FIG. 2B). Processor 206 may be configured to receive pattern information that specifies a pattern for input pixel data components. Processor 206 may receive this pattern information from one or more of engines 208, cache memory 210, or memory 204. Processor 206 is further configured to process each input pixel data component in a selected processing pipeline within pipelines 222 in accordance with the pattern information.

Processor 206 may be further configured to receive additional pattern information that specifies a pattern for output pixel data components that are processed by pipelines 222. Processor 206 may receive this additional pattern information from one or more of engines 208, cache memory 210, or memory 204. Processor 206 is then configured to provide each output pixel data component from a selected processing pipeline to one or more of output device 212 in accordance with the additional pattern information. In this manner, processor 206 is capable of dynamically and adaptively processing data components of various different patterns by having access to pattern information that describes these patterns. Processor 206 may receive pattern information from various sources, and patterns of data components to be processed by processor 206 may be updated or even added without requiring any hardware changes to processor 206. As a result, processor 206 is not limited to processing a predetermined number of data patterns, but is rather capable of handling a variety of different patterns that may be defined by software applications running on device 200.

FIG. 2B is a block diagram illustrating additional details of display processor 206, according to one aspect. In this aspect, processor 206 includes a command controller 220, registers 221, processing pipelines 222, output device sections 224A-224N (collectively, 224) and buffers 226. Processor 206 uses processing pipelines 222 for parallel processing of data components, according to one aspect. When the data components comprise pixel data components for image data, processing pipelines 222 may include three or more pipelines running in parallel. In certain instances, four pipelines may be utilized when the pixel data includes an alpha channel (such as RGB alpha) or for a CMYK color space. In general, processing pipelines 222 may include one or more pipelines that are each capable of processing data components for data channels. In one aspect, processing pipelines 222 may include individual execution units that are capable of executing instructions in parallel.

In one aspect, processing pipelines 222 perform operations on the data components, such as components of image data. When the data is image data, processing pipelines 222 may perform operations on pixel data components, such as rotation operations or scaling operations. The pixel data components may be received from memory 204 (FIG. 2A), cache memory 210, or from one or more of engines 208 (not shown).

Command controller 220 receives instructions for execution by processor 206, according to one aspect. Command controller 220 may also receive information indicative of data, such as pixel data to be received and/or accessed by processor 206. In one aspect, these instructions and information may be provided by control processor 209. In one aspect, these instructions and information may be provided from one or more of engines 208, memory 204, or cache memory 210.

Output device sections 224 deliver completed frames (such as frames of pixel data that has been processed by pipelines 222) to one or more of output devices 212, such as a display, according to one aspect. Processor 206 includes one or more output device sections 224. Output device sections 224 may often be used in situations where one or more output devices 212 are physical targets that require synchronization. For example, output device section 224A may be used for television outputs, while output device section 224N may handle RGB-based LCD targets. For example, sections 224 may synchronize the output of frames created by pipelines 222 with the vertical refresh timing of a target display (one of output devices 212) to prevent tearing. Alternatively, processing pipelines 222 may deliver completed frames to one or more of output devices 212 directly when synchronization may be less important.

In the example of FIG. 2B, processor 206 also includes one or more buffers 226. In one aspect, processing pipelines 222 may use buffers 226 for internal image buffering. For example, buffers 226 may include internal buffers, such as "iBufs." One or more internal buffers within buffers 226 may be provided per output device 212A-212N. In one aspect, internal buffers within buffers 226 may be used sequentially, ring-buffer style, to compose frames which are then handed off, such as, for example, to one or more of output devices 212.

In one aspect, processor 206 also includes one or more registers 221. Processor 206 may store data within registers 221 for use during instruction execution within processing pipelines 222. In one aspect, processor 206 may also store information within registers 221 that may be used in conjunction with received pattern information to process input data components in pipelines 222 or to process output data components from pipelines 222. In this aspect, certain information regarding data formats and patterns may remain substantially constant when processor 206 processes image data for one or more images. In such cases, processor 206 may store certain format or pattern information within registers 221 that remain substantially constant. When processor 206 receives dynamic pattern information from one or more of engines 208, memory 204, or cache memory 210 related to a specific group of data components for image data, processor 206 may use this received information in conjunction with format or pattern information stored in registers 221 to manage the processing of the data components. Various examples will be described in more detail below.

Figure 2C:
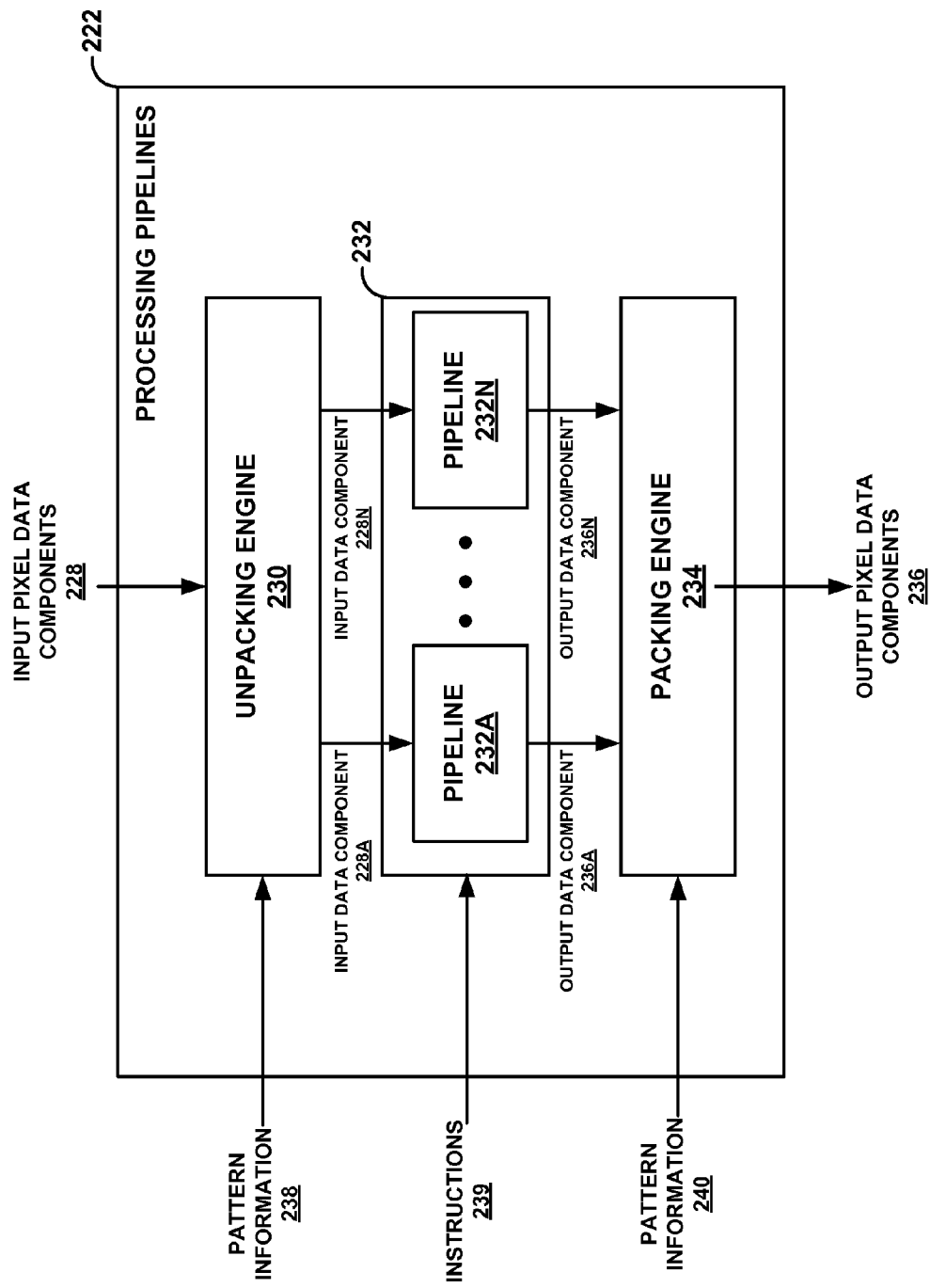
FIG. 2C is a block diagram illustrating additional details of the processing pipelines shown in FIG. 2B, according to an aspect of this disclosure.

FIG. 2C is a block diagram illustrating additional details of processing pipelines 222, according to one aspect. In this aspect, processing pipelines 222 includes an unpacking engine 230, parallel processing pipelines 232A-232N (collective, 232), and a packing engine. Pipelines 232 are capable of executing instructions in parallel, according to one aspect. As shown in FIG. 2C, each pipeline 232A-232N may include an execution unit.

In the example of FIG. 2C, unpacking engine 230 receives input pixel data components 228 when processing image data. Unpacking engine 230 also may be capable of receiving pattern information 238, either directly or through command controller 220, that specifies a pattern of the input pixel data components 228. In one aspect, this pattern information 238 may be specified by a user application executed by one of engines 208 and supplied to processor 206 through a software driver of that application. Based on pattern information 238, unpacking engine 230 unpacks a group of input pixel data components 228 based upon the pattern specified by pattern information 238 and process the unpacked input pixel data components 228A-228N of pixel data in their selected processing pipelines 232A-232N. In one aspect, each pixel data component 228A-228N is processed in a selected pipeline 232A-232N. In this aspect, pipelines 232 are then capable of processing input data components 228A-228N in parallel. For example, if input pixel data components 228 comprise pixel color components for an RGB color space, pixel data components 228 may comprise three components 228A, 228B, and 228C. In this example, pipeline 232A may process data component 228A, pipeline 232B may process data component 228B, and pipeline 232C may process data component 228C.

In one aspect, one or more of output device sections 224 (FIG. 2B) may include an unpacking engine similar to unpacking engine 230. In this aspect, the unpacking engine used in one or more of output device sections 224 may be used to unpack data components provided by processing pipelines 222 prior to processing such components to one or more of output devices 212.

Each pipeline 232A-232N uses respective input data components 228A-228N when executing instructions 239. Instructions 239 may be provided by one or more of engines 208, memory 204, or cache memory 210, and may be loaded by command controller 220, according to one aspect. As a result of instruction execution, pipelines 232A-232N generate, or produce, output pixel data components 236A-236N.

Packing engine 234 re-orders the output pixel data components 236A-236N into a specific pattern after they have been processed by their respective pipelines 232A-232N. Packing engine 234 is provided with pattern information 240 indicating what pattern to use to pack a group of the processed output pixel data components 236A-236N. In one aspect, packing engine 234 packs a group of output data components 236A-236N into an arrangement of packed data components 236 based on the pattern described by pattern information 240. Packing engine 234 can be provided pattern information 240 to arrange a group of the processed pixel data components 236A-236N into any specified pattern within output pixel data components 236 appropriate for a particular application, or for one or more of output devices 212. As one example, if output pixel data components 236 are to be immediately displayed after processing, it may be beneficial to provide pattern information 240 to packing engine 234 indicating the expected data arrangement for a frame buffer of a display (which would be one of output devices 212).

Pattern information 240 may be different and distinct from pattern information 238. In one aspect, packing engine 234 receives pattern information 240 from one or more of engines 208, main memory 204, or cache memory 210.

Packing engine 234 and unpacking engine 230 may pack and unpack data components based on various different patterns. Unpacking engine 230 may be capable of unpacking a group of input data components 228 into data components 228A-228N using any order or arrangement that is specified by pattern information 238. Similarly, packing engine 234 is capable of packing a group of output data components 236A-236N into packed data components 236 using any order or arrangement that is specified by pattern information 240.

Any type of pattern may be specified by pattern information 238 or 240. For example, pattern information 238 or 240 may specify an interleaved pattern (e.g., RGBARGBARG-BARGBA for an RGB alpha format), a planar pattern (e.g., RRRR, GGGG, BBBB, and AAAA), a partially interleaved pattern (e.g., RRGGBBAARRGGBBAA), or various other patterns, where R represents red data, G represents green data, B represents blue data, and A represents alpha (transparency) data.

Pseudo-planar patterns specified by pattern information 238 or 240 may be used for $YC_bC_r$ colorspace when the chroma channels are sub-sampled, according to one aspect. In this pattern, all of the luma samples may be stored together similar to a planar pattern. However, the two chroma channels may be intermingled similar to an interleaved pattern. Alpha, if used, may be treated like luma. Pseudo-planar patterns may be used in video hardware to keep the luma and chroma streams relatively in sync. These are just a few non-limiting examples of the types and varieties of patterns that may be specified by pattern information 238 or 240.

Figure 3:
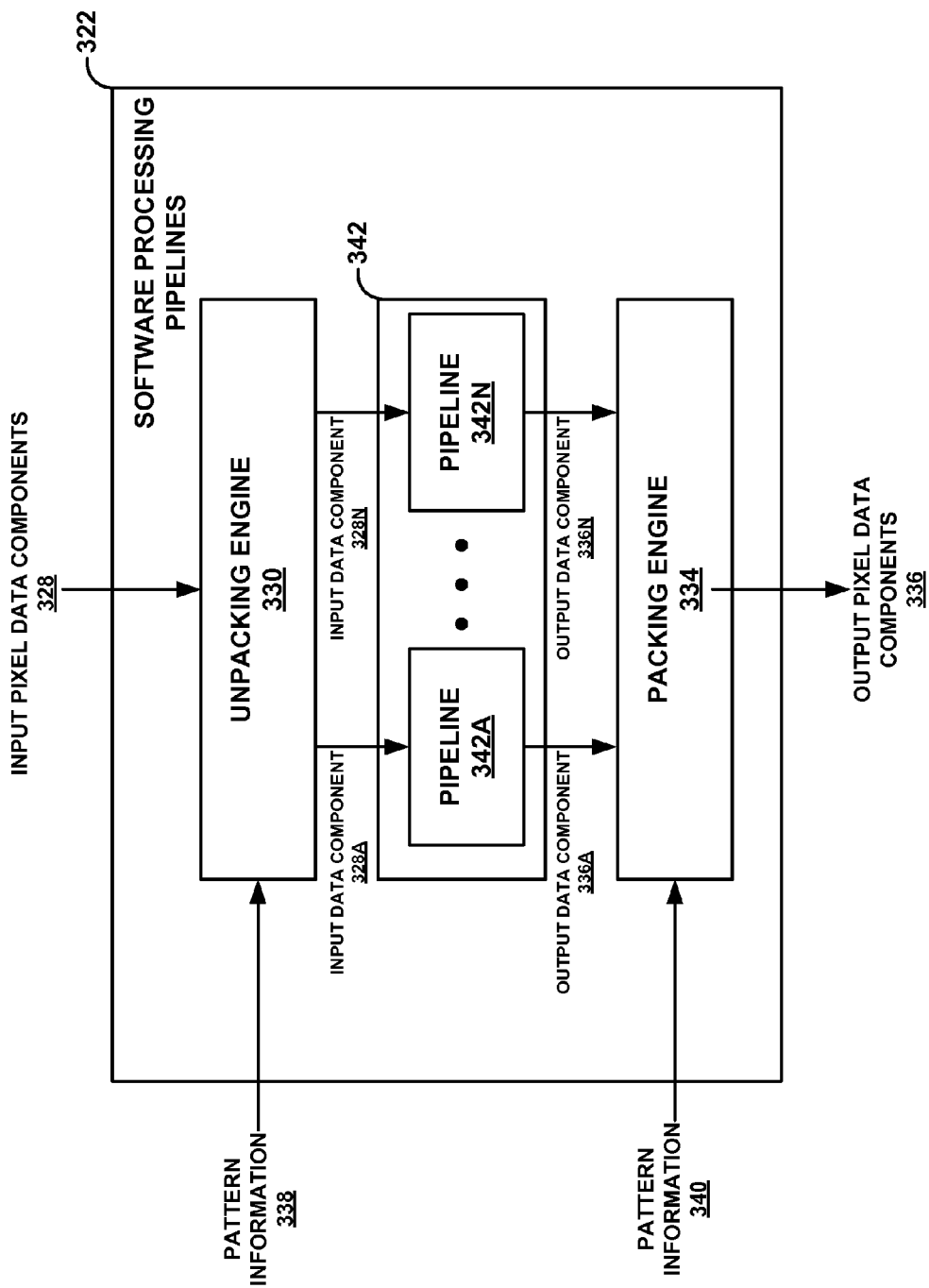
FIG. 3 is a block diagram of software processing pipelines that may be implemented by the device shown in FIG. 2A to provide pattern-based unpacking and packing of data channel information, according to an aspect of this disclosure.

FIG. 3 is a block diagram of software processing pipelines 322 that may be implemented by device 200, according to one aspect. In this aspect, processing pipelines 322 is a module that is implemented within a software application, rather than directly in hardware, and may be implemented by a general purpose CPU with or without SIMD vector extensions. This software module may include program instructions that are stored in main memory 204 and/or cache memory 210. The software may be executed by display processor 206, or may be executed by one or more of engines 208, according to one aspect. When the software is executed, it provides functionality for software processing pipelines 322 that is similar to the functionality provided by processing pipelines 222 shown in the example of FIG. 2C. Display processor 206, or one or more of engines 208, may comprise, in some aspects, a general purpose CPU.

In FIG. 3, the module for software processing pipelines 322 includes an unpacking engine 330, pipelines 342A-342N, and packing engine 334. Unpacking engine 330 receives input pixel data components 328 and pattern information 338, which may be provided from one or more software applications. Unpacking engine 330 unpacks a group of input pixel data components 328 into individual data components 328A-328N according to a pattern specified by pattern information 338, and processes the unpacked data components 328A-328N in selected pipelines 342A-342N (collectively, 342). Each pipeline 328A-328N is capable of processing one of data components 328A-328N to generate, or product, output data components 336A-336N, which are then provided to packing engine 334.

Packing engine 334 receives pattern information 340, which may be provided by one or more software applications. Packing engine 334 specifies a pattern that packing engine 334 uses to arrange a group of output data components 336A-336N into a packed group of output pixel data components 336. These data components 336 may then be provided, as output, to one or more software applications.

Figure 4:
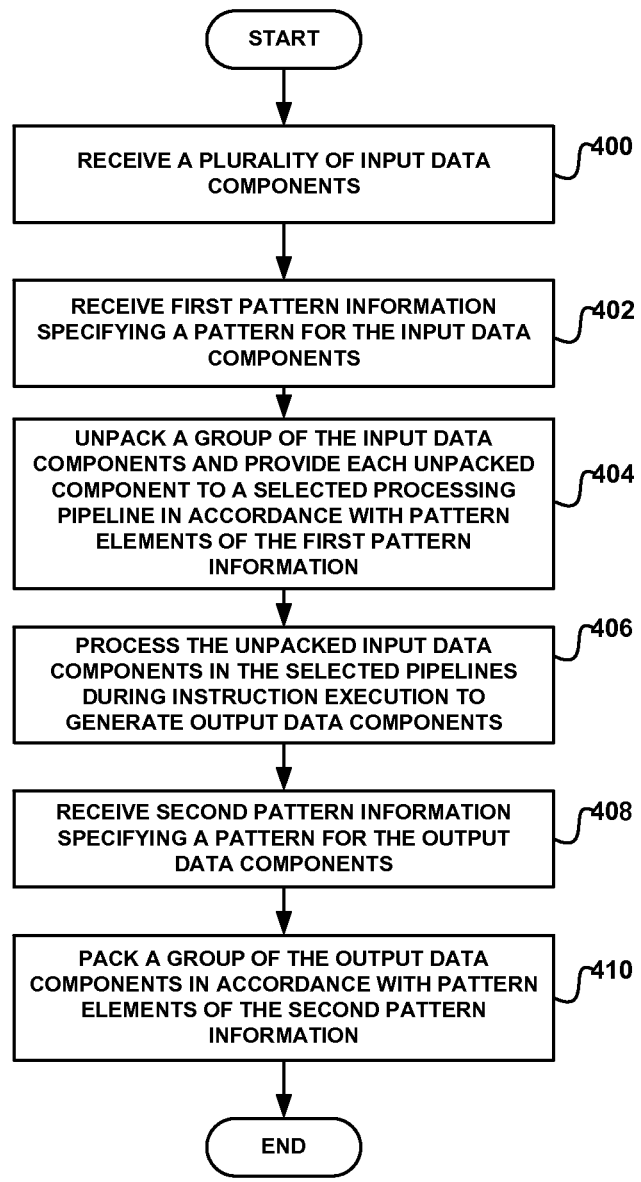
FIG. 4 is a flow diagram of a method that may be performed by the display processor shown in FIG. 2A, according to an aspect of this disclosure.

FIG. 4 is a flow diagram of a method that may be performed by display processor 206, according to one aspect. In the example of FIG. 4, the method includes acts 400, 402, 404, 406, 408, and 410.

As shown in FIG. 4, unpacking engine 230 within processing pipelines 222 (FIG. 2C) may receive a plurality of input data components 228 (400), such as pixel data color components. Unpacking engine 230 may further receive first pattern information 238 specifying a pattern for input data components 228 (402). Unpacking engine 230 then unpacks a group of the input data components 228 and provides each unpacked component 228A-228N to a selected processing pipeline 232A-232N in accordance with pattern elements included within pattern information 238 (404). In one aspect, pattern information 238 includes a plurality of pattern elements that are each associated with one or more of input data components 228, as will be described in more detail below.

The unpacked data components 228A-228N are processed in selected pipelines 232A-232N during instruction execution to generate output data components 236A-236N (406). These output data components 236A-236N are provided to packing engine 234. Packing engine 234 may then receive second pattern information 240 specifying a pattern for the output data components 236A-236N (408). Packing engine 234 packs a group of output data components 236A-236N into data components 236 in accordance with pattern elements included within pattern information 240 (410).

Figure 5C:
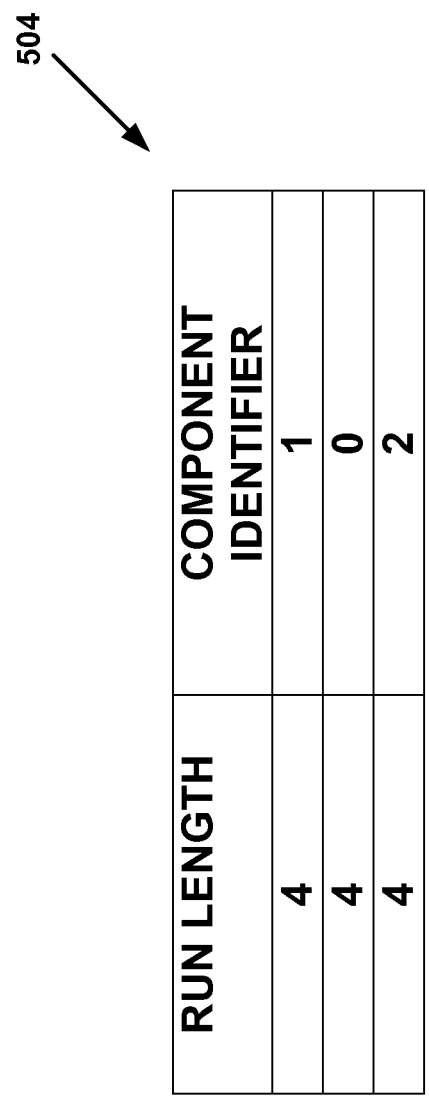

FIGS. 5A-5C are diagrams illustrating an example pattern 500 and examples of pattern information 502 and 504 that may be used to describe pattern 500, according to one aspect. In this aspect, example pattern information 502 and/or 504 may be provided to unpacking engine 230 (FIG. 2C) as pattern information 238, or may be provided to packing engine 234 as pattern information 240.

Example pattern 500 is shown in FIG. 5A. In this example, pattern 500 defines a pattern of multiple pixel color data components within the RGB color space. Pattern 500 defines a planar pattern format for twelve color data components associated with four pixels. Pattern 500 begins with four R (red) data components $R_{P0}, R_{P1}, R_{P2}, R_{P3}$, one for each of the four pixels P0-P3. Pattern 500 then specifies four G (green)

data components $G_{P0}$, $G_{P1}$, $G_{P2}$, $G_{P3}$, one for each pixel P0-P3. Finally, pattern 500 specifies four B (blue) data components $B_{P0}$, $B_{P1}$, $B_{P2}$, $B_{P3}$, one for each pixel P0-P3.

In one example aspect, input pixel data components 228 (FIG. 2C) that are received by unpacking engine 230, or output pixel data components 236 that are provided by packing engine 234, may have a format specified by pattern 500. In this case, pattern information 502 shown in FIG. 5B or pattern information 504 shown in FIG. 5C may be provided to specify pattern 500.

Pattern information 502 includes multiple component identifiers for each individual data component. Example component identifiers (1=Red, 0=Green, 2=Blue) that may be used are shown in FIG. 5B. Of course, any form of component identifiers may be used. Each separate component identifier within pattern information 502 (or, each row of a represented table of pattern information 502) corresponds to a pattern element of pattern information 502, according to one aspect. In FIG. 5B, each pattern element is associated with one color data component. In this aspect, an unpacking engine (such as unpacking engine 230) or a packing engine (such as packing engine 234) may process the pattern elements of pattern information 502 in a sequential, element by element (or row by row) fashion. Pattern information 502 uses twelve distinct pattern elements to specify a pattern of four red components, followed by four green components, followed by four blue components, which is the arrangement of pattern 500. In this fashion, pattern information 502 is one example of information that may be used to specify pattern 500. When unpacking engine 230 or packing engine 234 has processes each pattern element of pattern information 502, it may then repeat the process for each of the pattern elements in pattern information 502 to process additional data components on a continual basis using the pattern specified by pattern information 502, according to one aspect.

FIG. 5C illustrates another example of pattern information 504 that may be used to specify pattern 500. Pattern information 504 includes run-length information. A run length describes a number of the same type of data components (such as red color components) that are arranged sequentially within a pattern. In this aspect, each pattern element comprises a run length and a component identifier. Thus, pattern information 504 uses only three distinct pattern elements (represented as rows in FIG. 5C) to specify a pattern of four red components, followed by four green components, followed by four blue components. When, in this example, an individual pattern element has a run length greater than one, the pattern element is associated with multiple data components (such as multiple red data components), wherein the number of associated data components equals the value of the run length for the pattern element. The run length value may be provided as a two-bit binary representation, according to one aspect. In this aspect, a run length of four may be represented by a two-bit value of three (i.e., binary "11"). (A run length of one may be represented by a two-bit binary value of "00", a run length of two may be represented by a two-bit binary value of "01", and a run length of three may be represented by a two-bit binary value of "10".)

The values of component identifiers and run lengths shown in FIGS. 5B-5C are merely exemplary. These values may be represented or stored using various formats. For example, in some scenarios, each pattern element may comprise a one-byte field, wherein predefined bit values are associated with the component identifier and run length values. Various different formats may be used when representing the pattern elements. In addition, pattern information 502 and pattern information 504 may include one or more pattern elements. In some cases, device 200 may limit the number of pattern elements (such as, for example, sixteen pattern elements) contained within pattern information, but in other cases, no such limitation is present.

Figure 6A:
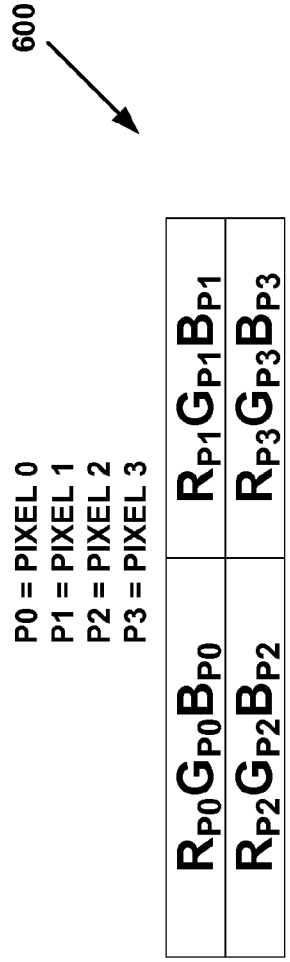

FIGS. 6A-6D are diagrams illustrating an example pattern 600 and examples of pattern information 602, 604, and 606 that may be used to describe pattern 600, according to one aspect. Pattern information 602, 604, and/or 606 may be included within pattern information 238 (FIG. 2C) that is provided to unpacking engine 230 or within pattern information 240 that is provided to packing engine 234. In some instances, data components, such as pixel data components, may be processed or stored in a tiled, or block format, rather than in a horizontal row, or line, format. Thus, in these instances, processor 206 receives input data components having this format. FIG. 6A shows an example pattern that defines one such tiled, or block, arrangement of data components. In this example, pattern 600 defines a two block by two block tile of data components. Each of the four blocks corresponds to three ordered RGB color components for a given pixel. Thus, the upper left block includes three ordered data components for pixel 0 ($R_{P0}G_{P0}B_{P0}$), the upper right block includes three ordered data components for pixel 1 ($R_{P1}G_{P1}B_{P1}$), the lower left block includes three ordered data components for pixel 2 ($R_{P2}G_{P2}B_{P2}$), and the lower right block includes three ordered data components for pixel 3 ($R_{P3}G_{P3}B_{P3}$).

Figure 6B:
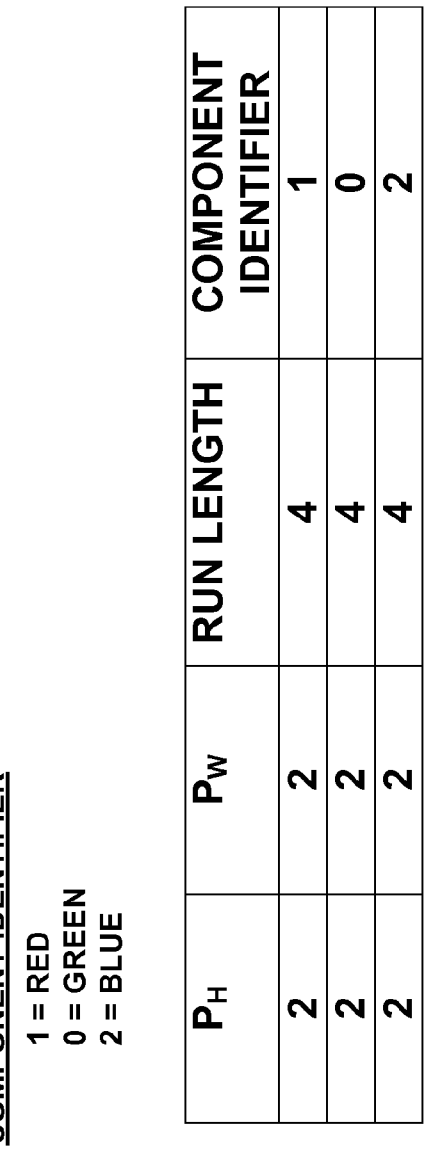

FIG. 6B shows a first example of pattern information 602 that may be used to specify or describe pattern 600 shown in FIG. 6A. In the example of FIG. 6B, pattern information 602 includes three distinct pattern elements (which are shown again, for illustration purposes, as rows within the table representation of pattern 602 shown in FIG. 6B). Each pattern element has a component identifier and a run length, which were described previously. To help specify the tiled format of pattern 600, however, each pattern element further includes a "patch" height ($P_H$) and a "patch" width ($P_W$). The patch height specifies the number of vertical blocks of the tile (in pattern 600), and the patch width specifies the number of horizontal blocks of the tile. Thus, because pattern 600 includes a two block by two block tile, the patch height and patch width are each specified as two for each pattern element.

The run length specified for each pattern element is four. (As discussed previously, the run length value may be provided as a two-bit binary representation, according to one aspect, wherein a run length of four may be represented as binary "11".) When the patch height and patch width are each equal to two for a pattern element, and the run length is equal to four, processor 206 is capable of using pattern 602 to specify pattern 600 for data components. Processor 206 may use unpacking engine 230 or packing engine 234 to process the first pattern element in pattern information 602 ($P_H$=2, $P_W$=2, Run Length=4, Component ID=1) to determine that one red data component for each pixel is included within each block of the tile. Similarly, processor 206 processes the second and third pattern elements to determine that one green data component and one blue data component for each pixel are also included within each block of the tile.

FIG. 6C shows a second example of pattern information 604 that may be used to specify the pattern 600, when additional information is used by processor 206. In this aspect, pattern elements within pattern information 604 include only a component identifier and a run length. However, processor 206 may use pattern information 604 in conjunction with additional information stored within one or more of registers 221 (FIG. 2B) when specifying patterns, such as pattern 600, that are to be used when processing or processing data components within processing pipelines 222. In the example of FIG. 6C, the patch height and patch width values may be stored within one or more of registers 221.

In certain cases, additional information, such as the patch height and patch width values, may be stored in registers 221 when the values remain substantially constant during the processing of multiple data components. In the present example, if the data components are continually received by or output from processor 206 in a two block by two block tiled arrangement, the patch height and patch width values of two will remain substantially constant. In this case, these values may be stored in registers 221. As a result, the size of each pattern element within pattern information 604 may be reduced.

FIG. 6D shows a third example of pattern information 606 that may be used to specify or otherwise describe pattern 600 shown in FIG. 6A. Pattern information 606 includes three pattern elements. Each pattern element includes a component identifier, a run length, a patch height, and a patch width, similar to the pattern elements shown in FIG. 6B. In addition, though, the pattern elements of pattern information 606 in FIG. 6D also include a horizontal scanning order ($S_H$) and a vertical scanning order ($S_V$). The values of $S_H$ and $S_V$ specify horizontal and vertical scanning orders of the individual blocks within the tile of pattern 600. In one aspect, these values are Boolean values, examples of which are shown in FIG. 6D. If $S_H$ is equal to zero, the horizontal scanning order specifies a left-to-right scanning order. If $S_V$ is equal to one, the horizontal scanning order specifies a right-to-left scanning order. If $S_V$ is equal to zero, the vertical scanning order specifies a top-to-bottom scanning order. If $S_V$ is equal to one, the vertical scanning order specifies a bottom-to-top scanning order.

Thus, the pattern elements within pattern information 606 describe pattern 600 by using the $S_H$ and $S_V$ values of zero for each pattern element. However, it can be seen from the example of FIG. 6D that each individual pattern element may specify values for $S_H$ and $S_V$. As a result, each pattern element may specify any value for a horizontal scanning order and a vertical scanning order when specifying, or describing, a pattern of data components.

In addition, the pattern elements of pattern information 606 also include a bits-per-pixel ($B_{pp}$) value. This value represents the number of bits per pixel for the component associated with each pattern element. The number of bits per pixel relates to the color resolution or depth of the component. In the example of FIG. 6D, each color component for the red-green-blue color space has a $B_{pp}$ value of eight bits per pixel. However, various other values of $B_{pp}$ may be used within pattern information 606. For example, the red color component may have a $B_{pp}$ value of five, the green color component may have a $B_{pp}$ value of six, and the blue color component may have a $B_{pp}$ value of five. Various different values such as these may be used within pattern information 606.

In one aspect, if the values of $S_H$ and $S_V$ remain substantially constant when processing multiple data components, these values may be stored in registers 221 of processor 206, rather than being included in pattern information 606. In this aspect, unpacking engine 230 and/or packing engine 234 (FIG. 2C) may access the values of $S_H$ and $S_V$ from registers 221 and use these values in conjunction with the received pattern information to process input data components or output data components. Similarly, if the $B_{pp}$ values remain substantially constant when processing multiple data components, these values may also be stored in registers 221 of processor 206, rather than being included within pattern information 606.

FIGS. 7A-7B are diagrams illustrating an example pattern 700 and an example of pattern information 702 that may be used to describe pattern 700, according to one aspect. Pattern information 702 may be included within pattern information 238 (FIG. 2C) that is provided to unpacking engine 230 or within pattern information 240 that is provided to packing engine 234, according to one aspect. The example pattern 700 of FIG. 7A is a four block by four block tile of pixel color component data within the $YC_rC_b$ color space using alpha (transparency). Each block includes multiple pixel color data components for one or more individual pixels (i.e., one or more of the sixteen represented pixels P0-P15). As can be seen from this pattern 700, each block within the tile includes one Y and one alpha color data component. However, each block further includes either the $C_r$ or the $C_b$ data component and its horizontal neighbor, but not both. As can be seen from pattern 700, the data components for $C_r$ and $C_b$, for each pair of pixels, alternate from one block to the next within the tile, assuming a left-to-right and top-to-bottom scanning orders within the tile.

Pattern 700 defines a format of color data components within the specified tile that may be utilized with a 422H (H2V1) sub-sampler. In 422H sub-sampling, the Y and alpha components are sampled once for each pixel, which is why the Y and alpha components are included within each block of the tile in pattern 700. In 422H sub-sampling, however, the $C_r$ and $C_b$ components are only sampled once per pair of pixels. Thus, in pattern 700, the $C_r$ and $C_b$ components alternate every other block, as just described above. Processor 206 may process data components (such as input data components 228 and/or output data components 236 shown in FIG. 2C) that conform to pattern 700 when 422H sub-sampling is performed external to processing pipelines 222. 422H<->444 re-samplers may be operatively coupled to unpacking engine 230 and/or packing engine 234. In one aspect, these re-samplers may be included within processor 206, one or more of engines 208, or one or more of output devices 212. In one aspect, a super-sampler (upsampler) is coupled to unpacking engine 230, and a sub-sampler is coupled to packing engine 234. 422H sub-sampling is often used in television and JPEG (Joint Photographic Experts Group) applications.

In one aspect, various other sub-samplers may be used within device 200, in place of or in addition to 422H sub-sampler. For example, 422V (H1V2) sub-samplers (often used with JPEG applications), 420 sub-sampler (often used with JPEG, MPEG, or camera applications), and 411 sub-samplers, to list a few, may be used. The pattern information provided to processor 206 may be customized and adapted to specify various patterns that may be used for pixel data components that are processed by these types of sub-samplers.

FIG. 7B shows an example of pattern information 702 that may be used to specify or otherwise describe pattern 700, according to one aspect. Pattern information 702 includes four pattern elements. Each pattern element includes a component identifier (examples of which are shown for $YC_rC_b$ alpha color space in FIG. 7B), a run length, a patch height, and a pitch width. Each pattern element further includes, however, a vertical sub-sampling value ($V_{ss}$) and a horizontal sub-sampling value ($H_{ss}$). In one aspect, an $H_{ss}$ value of one for identified data components indicates that these data components exist for every other block in the horizontal direction within tiled pattern 700. In this aspect, a $V_{ss}$ value of one for identified data components indicates that these data components exist for every other block in the vertical direction within tiled pattern 700. $H_{ss}$ and $V_{ss}$ values of zero indicate that the data components exist for every block with the horizontal and vertical directions, respectively, according to one aspect.

In the example pattern information 702 shown in FIG. 7B, the pattern elements corresponding to the $C_r$ and $C_b$ data components have $H_{ss}$ values of one, indicating that these data components exist for every other block in the horizontal direction within tiled pattern 700. Given that these data components exist for every other block, the run lengths for these pattern elements are equal to eight. The patch height and patch width values for these pattern elements are each equal to four, indicating that pattern 700 is a four block by four block tile.

The pattern elements corresponding to the Y (luma) and alpha data components also have patch height and patch width values of four. Because these pattern elements have run lengths equal to sixteen, but $V_{ss}$ and $H_{ss}$ values of zero, Y and alpha data components are included within each block of tiled pattern 700. Thus, the pattern elements in pattern information 702 describe the arrangement of components within pattern 700, according to one aspect.

In this example, the values of $V_{ss}$ and $H_{ss}$ are binary values, where a value of zero indicates no sub-sampling and a value of one indicates sub-sampling or spacing of a data component every other block in either the vertical or horizontal direction. However, in one aspect, the values of $V_{ss}$ and $H_{ss}$ may not be limited to binary values of one and zero. In this aspect, the values of $V_{ss}$ and $H_{ss}$ may specify specific sampling values for particular pattern elements. In addition, it is possible that the values of $V_{ss}$ and $H_{ss}$ may remain substantially constant during the processing of multiple data components. In this case, these values may be stored within registers 221 of processor 206, rather than being included within each pattern element of pattern information 702, according to one aspect. In this aspect, unpacking engine 230 and/or packing engine 234 (FIG. 2C) may access the values of $V_{ss}$ and $H_{ss}$ from registers 221 and use these values in conjunction with the received pattern information to process input data components or output data components.

FIG. 8 is a diagram illustrating another example of pattern information 800 that may be used to specify or otherwise describe a tiled pattern, according to one aspect. In this aspect, it is assumed that the pattern is similar to pattern 700 (FIG. 7A), including $YC_rC_b$ and alpha components, but is an eight block by eight block tiled pattern. As a result, each pattern element within pattern information 800 includes a patch height of eight and a patch width of eight. It is assumed that the pattern specified by pattern information 800 has a similar arrangement as that of pattern 700, in that Y and alpha components are provided in each block, but that $C_r$ and $C_b$ components alternate between blocks in the horizontal direction (using a left-to-right and top-to-bottom scan order). Thus, the pattern elements of pattern information 800 that are associated with the Y and alpha components each include a run length of sixty four, a $V_{ss}$ value of zero, and an $H_{ss}$ value of zero. The pattern elements of pattern information 800 that are associated with the $C_r$ and $C_b$ components each include a run length of thirty two, a $V_{ss}$ value of zero, and an $H_{ss}$ value of one.

Figure 9A:
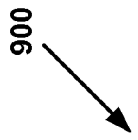
FIGS. 9A-9B are diagrams illustrating examples of pattern information that may be used by the processor shown in FIG. 1 to specify or otherwise describe example patterns for multi-channel audio data, according to an aspect of this disclosure.
Figure 9B:
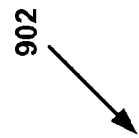

FIGS. 9A-9B are diagrams illustrating examples of pattern information 900 and 902 that may be used by processor 106 shown in FIG. 1 to specify or otherwise describe example patterns for multi-channel audio data, according to an aspect. As noted previously, programmable processor 106 is capable of processing data components having patterns that are specified by pattern information. In this aspect, processor 106 is capable of processing audio data components that are part of multi-channel audio data. This multi-channel audio data may comprise sound data or voice (speech) data.

In the example of FIGS. 9A-9B, it is assumed that processor 106 processes multi-channel sound data. The audio data components may include channel data associated with a front-left channel, a front-center channel, a front-right channel, a rear-left channel, a rear-center channel, a rear-right channel, and a sub-woofer channel. Various other forms of audio channels may also be used.

FIG. 9A shows examples of component identifiers that may be associated with these various audio channels. Pattern information 900 includes only a component identifier for each pattern element. Thus, in pattern information 900, each pattern element is associated with one of the audio data components specified by the associated component identifier. In this example, the pattern specified by pattern information 900 is a pattern of audio data components as follows: a front-left data component, a front-center data component, a front-right data component, a rear-left data component, a rear-center data component, a rear-right data component, and a sub-woofer data component. Each of these data components are part of a multi-channel audio data stream, according to one aspect. Pattern information 900 contains seven pattern elements for these data components. Once processor 106 has processed each of these seven pattern elements in a first iteration of data component processing, processor 106 repeats the process to continually handle audio data components using the pattern specified by pattern information 900. In this example, the pattern is an interleaved pattern of audio data components. In one aspect, processor 106 may include a packing engine and an unpacking engine. One or both of these engines may utilize pattern information 900 shown in FIG. 9A.

FIG. 9B provides another example of pattern information 902 that may be used by processor 106. The pattern specified by pattern information 902 is different than the pattern specified by pattern information 900. The pattern specified by pattern information 902 is a planar-type pattern. Each pattern element in pattern information 902 includes both a component identifier and a run length. In the example of FIG. 9B, each pattern element has a run length of four. Thus, the pattern specified by pattern information 902 includes four front-left data components, followed by four front-center data components, followed by four front-right data components, followed by four rear-left data components, followed by four rear-center data components, followed by four rear-right data components, followed by four sub-woofer data components, in a repeated fashion. As can be seen from the examples of pattern information 900 and 902, processor 106 is capable of processing any number of run-time, programmable patterns of multi-channel audio data, providing device 100 with a great deal of flexibility. In other aspects, processor 106 is similarly capable of processing multi-channel video data (video data components) using programmable patterns, as well.

The techniques described in this disclosure may be implemented within a general purpose microprocessor, digital signal processor (DSP), application specific integrated circuit (ASIC), field programmable gate array (FPGA), or other equivalent logic devices. Accordingly, the terms "processor" or "controller," as used herein, may refer to any of the foregoing structures or any other structure suitable for implementation of the techniques described herein.

The components and techniques described herein may be implemented in hardware, software, firmware, or any combination thereof. Any features described as modules or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-media applications and devices. In some aspects, for example, such components may form part of a mobile device, such as a wireless communication device handset.

If implemented in software, the techniques may be realized at least in part by a computer-readable medium comprising instructions that, when executed by one or more processors, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media.

The techniques additionally, or alternatively, may be realized at least in part by a computer-readable communication medium that carries or communicates code in the form of instructions or data structures and that can be accessed, read, and/or executed by one or more processors. Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media. Any software that is utilized may be executed by one or more processors, such as one or more DSP's, general purpose microprocessors, ASIC's, FPGA's, or other equivalent integrated or discrete logic circuitry.

Various aspects of the disclosure have been described. These and other aspects are within the scope of the following claims.

The invention claimed is:

1. A method comprising:
receiving pattern information that specifies a pattern for a plurality of input data components, wherein the pattern information comprises a plurality of pattern elements that are each associated with one or more of the input data components and specify an ordering of the plurality of input data components, and wherein each input data component is selected from a component group consisting of a still image data component, an audio data component, and a video data component; and
providing each input data component to a selected processing pipeline in accordance with the pattern information.

2. The method of claim 1, wherein providing each input data component to a selected processing pipeline in accordance with the pattern information comprises providing each input data component to a selected processing pipeline within a programmable processor.

3. The method of claim 1, further comprising:
receiving additional pattern information that specifies a second pattern for a plurality of output data components that are processed by a plurality of processing pipelines, wherein the additional pattern information comprises a plurality of pattern elements that are each associated with one or more of the output data components, and wherein each output data component is selected from a second component group consisting of a still image data component, an audio data component, and a video data component; and
processing each output data component from a selected processing pipeline in accordance with the additional pattern information.

4. The method of claim 3, wherein processing each output data component from a selected processing pipeline in accordance with the additional pattern information comprises processing each output data component from a selected processing pipeline to an output device in accordance with the additional pattern information.

5. The method of claim 3, further comprising packing the output data components into an arrangement of data components based on the second pattern specified by the additional pattern information, and wherein processing each output data component from a selected processing pipeline to the output device in accordance with the additional pattern information comprises providing the data components in the arrangement to the output device.

6. The method of claim 3, further comprising:
storing the output data components from the processing pipelines in a buffer prior to providing the output data components to the output device.

7. The method of claim 1, further comprising unpacking a group of the input data components into unpacked data components based upon the pattern specified by the pattern information, and wherein providing each input data component to a selected processing pipeline in accordance with the pattern information comprises providing the unpacked data components to a plurality of processing pipelines.

8. The method of claim 1, wherein the input data components comprise pixel data components.

9. The method of claim 1, wherein the input data components comprise multi-channel audio data components.

10. The method of claim 1, wherein each pattern element includes a component identifier for the associated one or more input data components.

11. The method of claim 10, wherein each pattern element further includes a run length that specifies a number of the one or more input data components that are associated with the pattern element.

12. The method of claim 11, wherein the pattern specified by the pattern information comprises a tiled pattern, wherein each pattern element of the pattern information further includes at least one of a patch height, a patch width, a vertical scanning order, a horizontal scanning order, a bits-per-pixel value, a vertical sub-sampling value, and a horizontal sub-sampling value, and wherein:
the patch height specifies a block height of the tiled pattern,
the patch width specifies a block width of the tiled pattern,
the vertical scanning order specifies a block scanning order for the tiled pattern in a vertical direction,
the horizontal scanning order specifies a block scanning order for the tiled pattern in a horizontal direction,
the bits-per-pixel value specifies a number of bits per pixel,
the vertical sub-sampling value specifies a block sub-sampling value for the tiled pattern in a vertical direction, and
the horizontal sub-sampling value specifies a block sub-sampling value for the tiled pattern in a horizontal direction.

13. The method of claim 1, further comprising receiving additional information that is used in conjunction with the pattern information to specify the pattern for the input data components, and wherein providing each input data component to a selected processing pipeline in accordance with the pattern information comprises providing each input data component to a selected processing pipeline in accordance with the pattern information and the additional information.

14. The method of claim 13, wherein receiving the additional information comprises receiving the additional information from one or more registers.

15. A device comprising:
a programmable processor having a plurality of processing pipelines,
wherein the processor is configured to receive pattern information that specifies a pattern for a plurality of input data components, the pattern information comprising a plurality of pattern elements that are each associated with one or more of the input data components and specify an ordering of the plurality of input data components, and each input data component being selected from a component group consisting of a still image data component, an audio data component, and a video data component, and
wherein the processor is further configured to provide each input data component to a selected processing pipeline of the processor in accordance with the pattern information.

16. The device of claim 15, wherein:
the processor is further configured to receive additional pattern information that specifies a second pattern for a plurality of output data components that are processed by the processing pipelines, the additional pattern information comprising a plurality of pattern elements that are each associated with one or more of the output data components, and each output data component being selected from a second component group consisting of a still image data component, an audio data component, and a video data component; and
the processor is further configured to process each output data component from a selected processing pipeline in accordance with the additional pattern information.

17. The device of claim 16, further comprising an output device, wherein the processor is configured to provide each output data component from a selected processing pipeline to the output device in accordance with the additional pattern information.

18. The device of claim 17, further comprising a packing engine configured to pack the output data components into an arrangement of data components based on the second pattern specified by the additional pattern information, wherein the packing engine is further configured to provide the data components of the arrangement to the output device.

19. The device of claim 18, further comprising a buffer, wherein the packing engine is configured to store the data components of the arrangement within the buffer prior to providing the data components to the output device.

20. The device of claim 15, further comprising an unpacking engine configured to unpack a group of the input data components into unpacked data components based upon the pattern specified by the pattern information, and wherein the unpacking engine is further configured to provide the unpacked data components to the processing pipelines.

21. The device of claim 15, wherein each pattern element includes a component identifier for the associated one or more input data components.

22. The device of claim 21, wherein each pattern element further includes a run length that specifies a number of the one or more input data components that are associated with the pattern element.

23. The device of claim 22, wherein the pattern specified by the pattern information comprises a tiled pattern, wherein each pattern element of the pattern information further includes at least one of a patch height, a patch width, a vertical scanning order, a horizontal scanning order, a bits-per-pixel value, a vertical sub-sampling value, and a horizontal sub-sampling value, and wherein:
the patch height specifies a block height of the tiled pattern,
the patch width specifies a block width of the tiled pattern,
the vertical scanning order specifies a block scanning order for the tiled pattern in a vertical direction,
the horizontal scanning order specifies a block scanning order for the tiled pattern in a horizontal direction,
the bits-per-pixel value specifies a number of bits per pixel,
the vertical sub-sampling value specifies a block sub-sampling value for the tiled pattern in a vertical direction, and
the horizontal sub-sampling value specifies a block sub-sampling value for the tiled pattern in a horizontal direction.

24. The device of claim 15, further comprising one or more registers, wherein the processor is configured to receive additional information stored in the one or more registers and use the additional information in conjunction with the pattern information to specify the pattern for the input data components.

25. The device of claim 15, wherein the processor comprises a display processor.

26. The device of claim 15, wherein the device comprises a wireless communication device handset.

27. The device of claim 15, wherein the device comprises one or more integrated circuit devices.

28. A non-transitory computer-readable medium comprising instructions for causing a programmable processor to:
receive pattern information that specifies a pattern for a plurality of input data components, wherein the pattern information comprises a plurality of pattern elements that are each associated with one or more of the input data components and specify an ordering of the plurality of input data components, and wherein each input data component is selected from a component group consisting of a still image data component, an audio data component, and a video data component; and
provide each input data component to a selected processing pipeline in accordance with the pattern information.

29. The computer-readable medium of claim 28, further comprising instructions for causing the processor to:
receive additional pattern information that specifies a second pattern for a plurality of output data components that are processed by a plurality of processing pipelines, wherein the additional pattern information comprises a plurality of pattern elements that are each associated with one or more of the output data components, and wherein each output data component is selected from a second component group consisting of a still image data component, an audio data component, and a video data component; and
process each output data component from a selected processing pipeline in accordance with the additional pattern information.

30. The computer-readable medium of claim 29, wherein the instructions for causing the processor to process each output data component from a selected processing pipeline in accordance with the additional pattern information comprise instructions for causing the processor to provide each output data component from a selected processing pipeline to an output device in accordance with the additional pattern information.

31. The computer-readable medium of claim 29, further comprising instructions for causing the processor to pack the output data components into an arrangement of data components based on the second pattern specified by the additional pattern information, and wherein the instructions for causing the processor to provide each output data component from a selected processing pipeline to the output device in accordance with the additional pattern information comprise instructions for causing the processor to provide the data components in the arrangement to the output device.

32. The computer-readable medium of claim 29, further comprising instructions for causing the processor to:
store the output data components from the processing pipelines in a buffer prior to providing the output data components to the output device.

33. The computer-readable medium of claim 28, further comprising instructions for causing the processor to unpack a group of the input data components into unpacked data components based upon the pattern specified by the pattern information, and wherein the instructions for causing the processor to provide each input data component to a selected processing pipeline in accordance with the pattern information comprise instructions for causing the processor to provide the unpacked data components to a plurality of processing pipelines.

34. The computer-readable medium of claim 28, wherein the input data components comprise pixel data components.

35. The computer-readable medium of claim 28, wherein the input data components comprise multi-channel audio data components.

36. The computer-readable medium of claim 28, wherein each pattern element includes a component identifier for the associated one or more input data components.

37. The computer-readable medium of claim 36, wherein each pattern element further includes a run length that specifies a number of the one or more input data components that are associated with the pattern element.

38. The computer-readable medium of claim 37, wherein the pattern specified by the pattern information comprises a tiled pattern, wherein each pattern element of the pattern information further includes at least one of a patch height, a patch width, a vertical scanning order, a horizontal scanning order, a bits-per-pixel value, a vertical sub-sampling value, and a horizontal sub-sampling value, and wherein:
the patch height specifies a block height of the tiled pattern,
the patch width specifies a block width of the tiled pattern,
the vertical scanning order specifies a block scanning order for the tiled pattern in a vertical direction,
the horizontal scanning order specifies a block scanning order for the tiled pattern in a horizontal direction,
the bits-per-pixel value specifies a number of bits per pixel,
the vertical sub-sampling value specifies a block sub-sampling value for the tiled pattern in a vertical direction, and
the horizontal sub-sampling value specifies a block sub-sampling value for the tiled pattern in a horizontal direction.

39. The computer-readable medium of claim 28, further comprising instructions for causing the processor to receive additional information that is used in conjunction with the pattern information to specify the pattern for the input data components, and wherein the instructions for causing the processor to provide each input data component to a selected processing pipeline in accordance with the pattern information comprise instructions for causing the processor to provide each input data component to a selected processing pipeline in accordance with the pattern information and the additional information.

40. The computer-readable medium of claim 39, wherein the instructions for causing the processor to receive the additional information comprise instructions for causing the processor to receive the additional information from one or more registers.

41. A device comprising:
means for receiving pattern information that specifies a pattern for a plurality of input data components, wherein the pattern information comprises a plurality of pattern elements that are each associated with one or more of the input data components and specify an ordering of the plurality of input data components, and wherein each input data component is selected from a component group consisting of a still image data component, an audio data component, and a video data component; and
means for providing each input data component to a selected processing pipeline in accordance with the pattern information.

42. The device of claim 41, further comprising:
means for receiving additional pattern information that specifies a second pattern for a plurality of output data components that are processed by a plurality of processing pipelines, wherein the additional pattern information comprises a plurality of pattern elements that are each associated with one or more of the output data components, and wherein each output data component is selected from a second component group consisting of a still image data component, an audio data component, and a video data component; and
means for processing each output data component from a selected processing pipeline in accordance with the additional pattern information.

43. The device of claim 42, wherein the means for processing each output data component from a selected processing pipeline in accordance with the additional pattern information comprises means for providing each output data component from a selected processing pipeline to an output device in accordance with the additional pattern information.

44. The device of claim 42, further comprising means for packing the output data components into an arrangement of data components based on the second pattern specified by the additional pattern information, and wherein the means for providing each output data component from a selected processing pipeline to the output device in accordance with the additional pattern information comprises means for providing the data components in the arrangement to the output device.

45. The device of claim 42, further comprising:
means for storing the output data components from the processing pipelines in a buffer prior to providing the output data components to the output device.

46. The device of claim 41, further comprising means for unpacking a group of the input data components into unpacked data components based upon the pattern specified by the pattern information, and wherein the means for providing each input data component to a selected processing pipeline in accordance with the pattern information comprises means for providing the unpacked data components to a plurality of processing pipelines.

47. The device of claim 41, wherein the input data components comprise pixel data components.

48. The device of claim 41, wherein the input data components comprise multi-channel audio data components.

49. The device of claim 41, wherein each pattern element includes a component identifier for the associated one or more input data components.

50. The device of claim 49, wherein each pattern element further includes a run length that specifies a number of the one or more input data components that are associated with the pattern element.

51. The device of claim 50, wherein the pattern specified by the pattern information comprises a tiled pattern, wherein each pattern element of the pattern information further includes at least one of a patch height, a patch width, a vertical scanning order, a horizontal scanning order, a bits-per-pixel value, a vertical sub-sampling value, and a horizontal sub-sampling value, and wherein:
the patch height specifies a block height of the tiled pattern,
the patch width specifies a block width of the tiled pattern,
the vertical scanning order specifies a block scanning order for the tiled pattern in a vertical direction,
the horizontal scanning order specifies a block scanning order for the tiled pattern in a horizontal direction,
the bits-per-pixel value specifies a number of bits per pixel,
the vertical sub-sampling value specifies a block sub-sampling value for the tiled pattern in a vertical direction, and
the horizontal sub-sampling value specifies a block sub-sampling value for the tiled pattern in a horizontal direction.

52. The device of claim 41, further comprising means for receiving additional information that is used in conjunction with the pattern information to specify the pattern for the input data components, and wherein the means for providing each input data component to a selected processing pipeline in accordance with the pattern information comprises means for providing each input data component to a selected processing pipeline in accordance with the pattern information and the additional information.

53. The device of claim 52, wherein the means for receiving the additional information comprises means for receiving the additional information from one or more registers.

54. A method comprising:
receiving pattern information that specifies a pattern for a plurality of output data components that are processed by a plurality of processing pipelines, wherein the pattern information comprises a plurality of pattern elements that are each associated with one or more of the output data components and specify an ordering of the plurality of input data components, and wherein each output data component is selected from a component group consisting of a still image data component, an audio data component, and a video data component; and
processing each output data component from a selected processing pipeline in accordance with the pattern information.

55. The method of claim 54, wherein processing each output data component from a selected processing pipeline in accordance with the pattern information comprises providing each output data component from a selected processing pipeline to an output device in accordance with the pattern information.

56. The method of claim 54, further comprising packing the output data components into an arrangement of data components based on the pattern specified by the pattern information, and wherein providing each output data component from a selected processing pipeline to the output device in accordance with the pattern information comprises providing the data components in the arrangement to the output device.

57. The method of claim 54, wherein the output data components comprise pixel data components.

58. The method of claim 54, wherein the output data components comprise multi-channel audio data components.

59. The method of claim 54, wherein each pattern element includes a component identifier for the associated one or more output data components.

60. The method of claim 59, wherein each pattern element further includes a run length that specifies a number of the one or more output data components that are associated with the pattern element.

61. The method of claim 60, wherein the pattern specified by the pattern information comprises a tiled pattern, wherein each pattern element of the pattern information further includes at least one of a patch height, a patch width, a vertical scanning order, a horizontal scanning order, a bits-per-pixel value, a vertical sub-sampling value, and a horizontal sub-sampling value, and wherein:
the patch height specifies a block height of the tiled pattern,
the patch width specifies a block width of the tiled pattern,
the vertical scanning order specifies a block scanning order for the tiled pattern in a vertical direction,
the horizontal scanning order specifies a block scanning order for the tiled pattern in a horizontal direction,
the bits-per-pixel value specifies a number of bits per pixel,
the vertical sub-sampling value specifies a block sub-sampling value for the tiled pattern in a vertical direction, and
the horizontal sub-sampling value specifies a block sub-sampling value for the tiled pattern in a horizontal direction.

62. The method of claim 54, further comprising receiving additional information that is used in conjunction with the pattern information to specify the pattern for the output data components that are processed by the processing pipelines, and wherein processing each output data component from a selected processing pipeline in accordance with the pattern information comprises processing each output data component from a selected processing pipeline in accordance with the pattern information and the additional information.

63. A device comprising:
a programmable processor having a plurality of processing pipelines,
wherein the processor is configured to receive pattern information that specifies a pattern for a plurality of output data components that are processed by the processing pipelines, the pattern information comprising a plurality of pattern elements that are each associated with one or more of the output data components and specify an ordering of the plurality of input data components, and each output data component being selected from a component group consisting of a still image data component, an audio data component, and a video data component, and
wherein the processor is further configured to process each output data component from a selected processing pipeline of the processor in accordance with the pattern information.

64. The device of claim 63, further comprising an output device, wherein the processor is configured to provide each output data component from a selected processing pipeline to the output device in accordance with the pattern information.

65. The device of claim 64, further comprising a packing engine configured to pack the output data components into an arrangement of data components based on the pattern specified by the pattern information and to provide the data components in the arrangement to the output device.

66. The device of claim 63, wherein the output data components comprise pixel data components.

67. The device of claim 63, wherein the output data components comprise multi-channel audio data components.

68. The device of claim 63, wherein each pattern element includes a component identifier for the associated one or more output data components.

69. The device of claim 68, wherein each pattern element further includes a run length that specifies a number of the one or more output data components that are associated with the pattern element.

70. The device of claim 69, wherein the pattern specified by the pattern information comprises a tiled pattern, wherein each pattern element of the pattern information further includes at least one of a patch height, a patch width, a vertical scanning order, a horizontal scanning order, a bits-per-pixel value, a vertical sub-sampling value, and a horizontal sub-sampling value, and wherein:
the patch height specifies a block height of the tiled pattern,
the patch width specifies a block width of the tiled pattern,
the vertical scanning order specifies a block scanning order for the tiled pattern in a vertical direction,
the horizontal scanning order specifies a block scanning order for the tiled pattern in a horizontal direction,
the bits-per-pixel value specifies a number of bits per pixel,
the vertical sub-sampling value specifies a block sub-sampling value for the tiled pattern in a vertical direction, and
the horizontal sub-sampling value specifies a block sub-sampling value for the tiled pattern in a horizontal direction.

71. The device of claim 63, wherein the processor is further configured to receive additional information that is used in conjunction with the pattern information to specify the pattern for the output data components that are processed by the processing pipelines, and wherein the processor is configured to process each output data component from a selected processing pipeline in accordance with the pattern information and the additional information.

72. The device of claim 63, wherein the device comprises a wireless communication device handset.

73. The device of claim 63, wherein the device comprises one or more integrated circuit devices.

74. A non-transitory computer-readable medium comprising instructions for causing a programmable processor to:
receive pattern information that specifies a pattern for a plurality of output data components that are processed by a plurality of processing pipelines, wherein the pattern information comprises a plurality of pattern elements that are each associated with one or more of the output data components and specify an ordering of the plurality of input data components, and wherein each output data component is selected from a component group consisting of a still image data component, an audio data component, and a video data component; and
process each output data component from a selected processing pipeline in accordance with the pattern information.

75. The computer-readable medium of claim 74, wherein the instructions for causing the processor to process each output data component from a selected processing pipeline in accordance with the pattern information comprise instructions for causing the processor to provide each output data component from a selected processing pipeline to an output device in accordance with the pattern information.

76. The computer-readable medium of claim 74, further comprising instructions for causing the processor to pack the output data components into an arrangement of data components based on the pattern specified by the pattern information, and wherein the instructions for causing the processor to provide each output data component from a selected processing pipeline to the output device in accordance with the pattern information comprise instructions for causing the processor to provide the data components in the arrangement to the output device.

77. The computer-readable medium of claim 74, wherein the output data components comprise pixel data components.

78. The computer-readable medium of claim 74, wherein the output data components comprise multi-channel audio data components.

79. The computer-readable medium of claim 74, wherein each pattern element includes a component identifier for the associated one or more output data components.

80. The computer-readable medium of claim 79, wherein each pattern element further includes a run length that specifies a number of the one or more output data components that are associated with the pattern element.

81. The computer-readable medium of claim 80, wherein the pattern specified by the pattern information comprises a tiled pattern, wherein each pattern element of the pattern information further includes at least one of a patch height, a patch width, a vertical scanning order, a horizontal scanning order, a bits-per-pixel value, a vertical sub-sampling value, and a horizontal sub-sampling value, and wherein:
the patch height specifies a block height of the tiled pattern,
the patch width specifies a block width of the tiled pattern,
the vertical scanning order specifies a block scanning order for the tiled pattern in a vertical direction,
the horizontal scanning order specifies a block scanning order for the tiled pattern in a horizontal direction,
the bits-per-pixel value specifies a number of bits per pixel,
the vertical sub-sampling value specifies a block sub-sampling value for the tiled pattern in a vertical direction, and
the horizontal sub-sampling value specifies a block sub-sampling value for the tiled pattern in a horizontal direction.

82. The computer-readable medium of claim 74, further comprising instructions for causing the processor to receive additional information that is used in conjunction with the pattern information to specify the pattern for the output data components that are processed by the processing pipelines, and wherein the instructions for causing the processor to process each output data component from a selected processing pipeline in accordance with the pattern information comprise instructions for causing the processor to process each output data component from a selected processing pipeline in accordance with the pattern information and the additional information.

83. A device comprising:
means for receiving pattern information that specifies a pattern for a plurality of output data components that are processed by a plurality of processing pipelines, wherein the pattern information comprises a plurality of pattern elements that are each associated with one or more of the output data components and specify an ordering of the plurality of input data components, and wherein each output data component is selected from a component group consisting of a still image data component, an audio data component, and a video data component; and means for processing each output data component from a selected processing pipeline in accordance with the pattern information.

84. The device of claim 83, wherein the means for processing each output data component from a selected processing pipeline in accordance with the pattern information comprises means for providing each output data component from a selected processing pipeline to an output device in accordance with the pattern information.

85. The device of claim 83, further comprising means for packing the output data components into an arrangement of data components based on the pattern specified by the pattern information, and wherein the means for providing each output data component from a selected processing pipeline to the output device in accordance with the pattern information comprises means for providing the data components in the arrangement to the output device.

86. The device of claim 83, wherein the output data components comprise pixel data components.

87. The device of claim 83, wherein the output data components comprise multi-channel audio data components.

88. The device of claim 83, wherein each pattern element includes a component identifier for the associated one or more output data components.

89. The device of claim 88, wherein each pattern element further includes a run length that specifies a number of the one or more output data components that are associated with the pattern element.

90. The device of claim 89, wherein the pattern specified by the pattern information comprises a tiled pattern, wherein each pattern element of the pattern information further includes at least one of a patch height, a patch width, a vertical scanning order, a horizontal scanning order, a bits-per-pixel value, a vertical sub-sampling value, and a horizontal sub-sampling value, and wherein:

the patch height specifies a block height of the tiled pattern,
the patch width specifies a block width of the tiled pattern,
the vertical scanning order specifies a block scanning order for the tiled pattern in a vertical direction,
the horizontal scanning order specifies a block scanning order for the tiled pattern in a horizontal direction,
the bits-per-pixel value specifies a number of bits per pixel,
the vertical sub-sampling value specifies a block sub-sampling value for the tiled pattern in a vertical direction, and
the horizontal sub-sampling value specifies a block sub-sampling value for the tiled pattern in a horizontal direction.

91. The device of claim 83, further comprising means for receiving additional information that is used in conjunction with the pattern information to specify the pattern for the output data components that are processed by the processing pipelines, and wherein the means for processing each output data component from a selected processing pipeline in accordance with the pattern information comprises means for processing each output data component from a selected processing pipeline in accordance with the pattern information and the additional information.

* * * * *